H. FELDMEIER & C. B. DALZELL.
APPARATUS FOR TREATING MILK, &c.
APPLICATION FILED AUG. 23, 1909.
1,034,225.
Patented July 30, 1912.
3 SHEETS—SHEET 1.
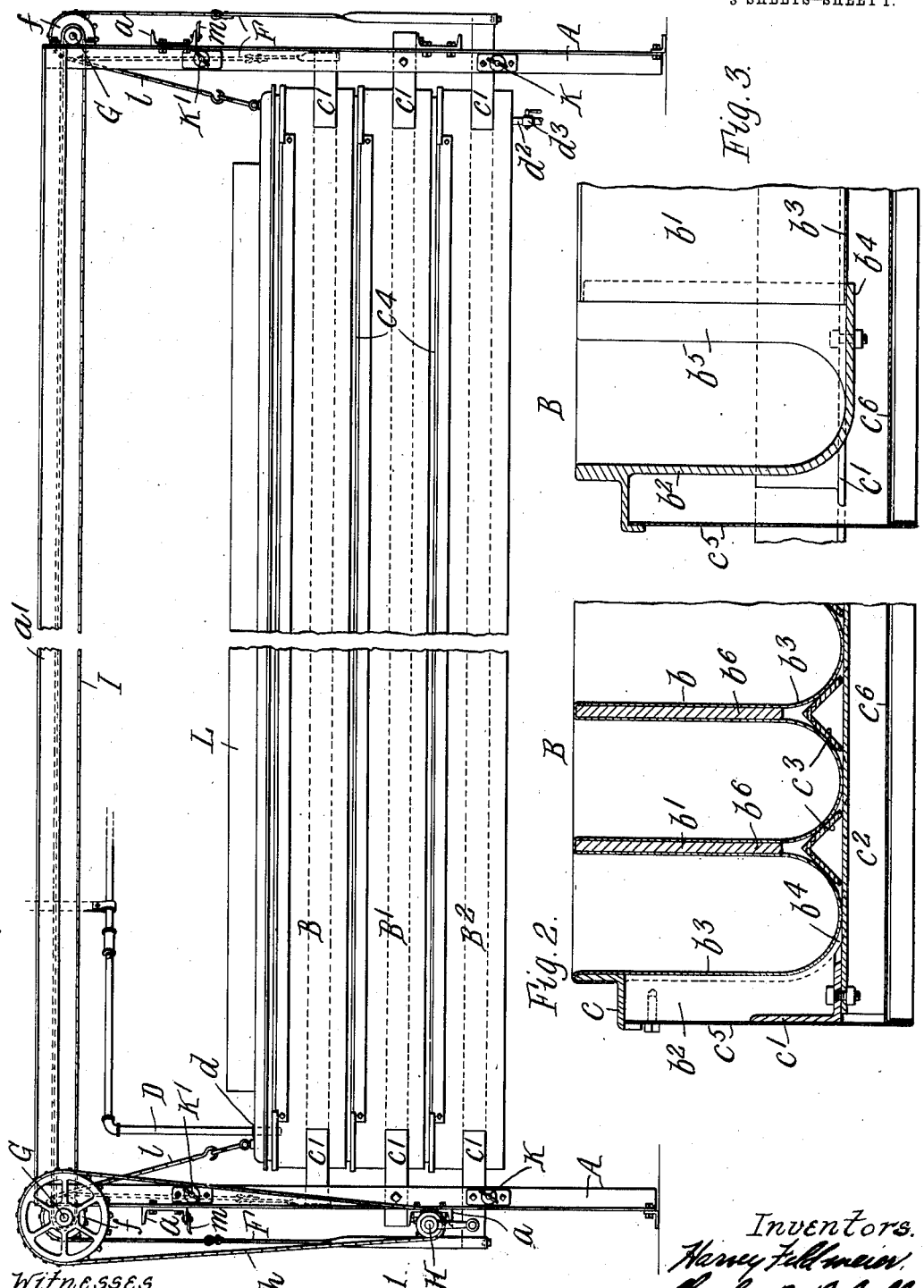
Witnesses.
A. G. Dimon
E. A. Volk.
Inventors.
Harvey Feldmeier,
Charles B. Dalzell,
By W. H. Helm Rastus Hay
Attorneys.

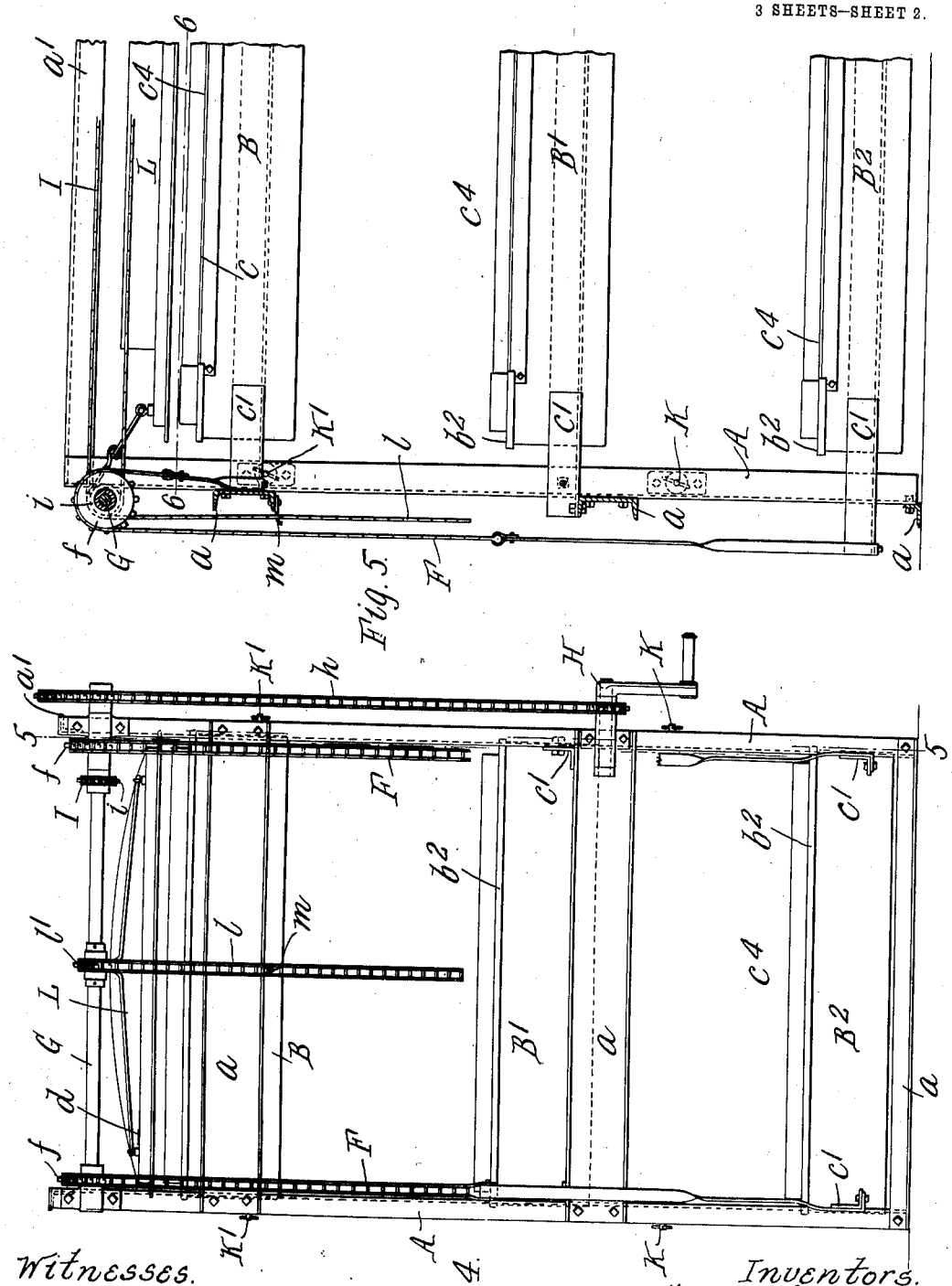

H. FELDMEIER & C. B. DALZELL.
APPARATUS FOR TREATING MILK, &c.
APPLICATION FILED AUG. 23, 1909.
1,034,225.
Patented July 30, 1912.
3 SHEETS—SHEET 3.
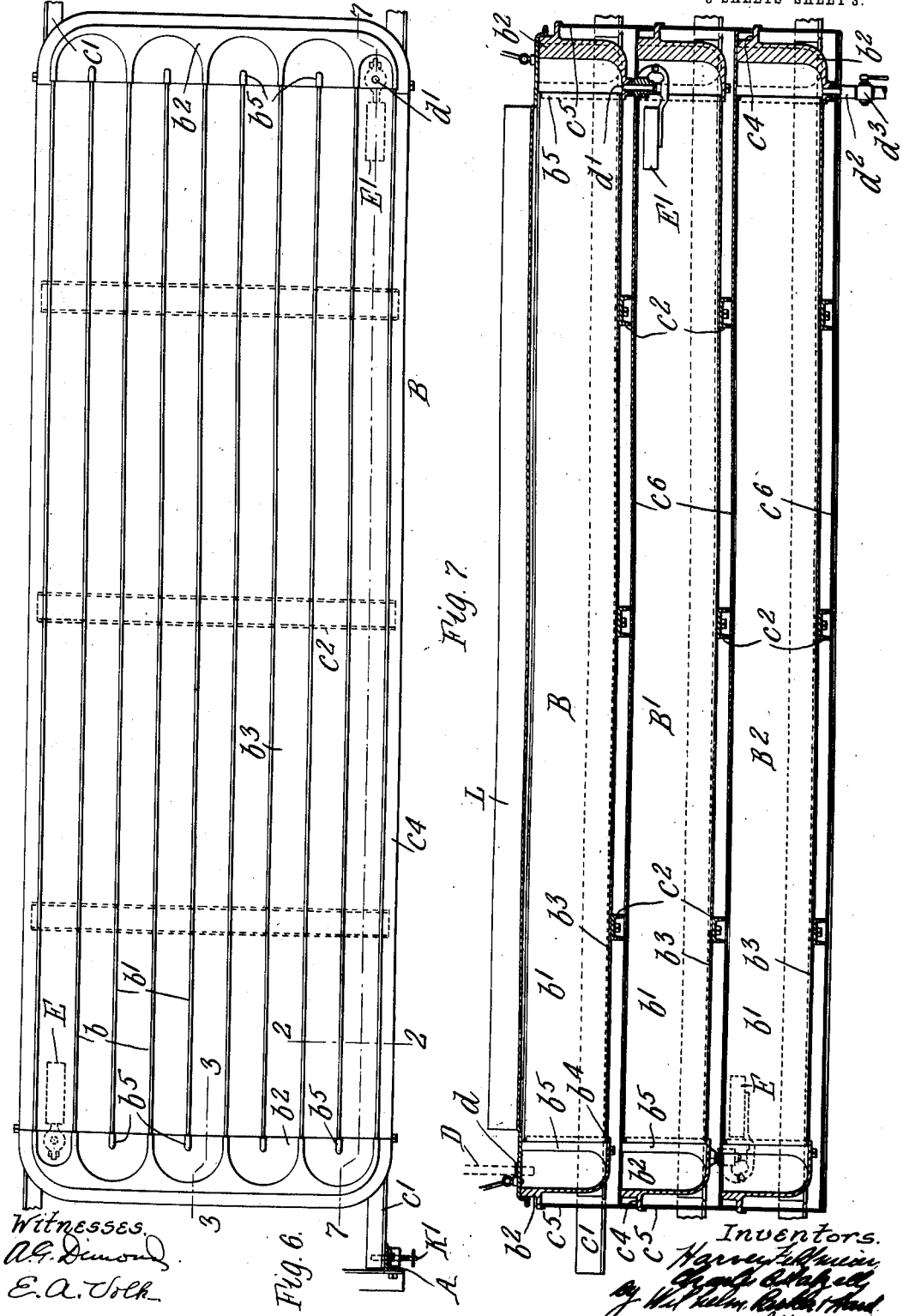

UNITED STATES PATENT OFFICE.

HARVEY FELDMEIER AND CHARLES B. DALZELL, OF LITTLE FALLS, NEW YORK, ASSIGNORS TO D. H. BURRELL & COMPANY, OF LITTLE FALLS, NEW YORK.

APPARATUS FOR TREATING MILK, &c.

1,034,225.  Specification of Letters Patent.  Patented July 30, 1912.

Application filed August 28, 1909. Serial No. 514,323.

*To all whom it may concern:*

Be it known that we, HARVEY FELDMEIER and CHARLES B. DALZELL, citizens of the United States, residing at Little Falls, in the county of Herkimer and State of New York, have invented a new and useful Improvement in Apparatus for Treating Milk, &c., of which the following is a specification.

This invention relates to vats, holders or conduits which are employed in apparatus for pasteurizing milk and other liquids for subjecting the liquid to heat for a sufficient length of time to render the bacilli or germs inocuous.

In pasteurizing milk it is necessary to keep the milk at a suitable temperature for a period of time depending upon the temperature to which it is heated, and it is desirable to keep the milk flowing uninterruptedly during this period, whereby several important advantages are gained, for instance the cream is prevented from rising, the milk is prevented from coating the surfaces with which it comes in contact, foam which may have formed is dissipated, and the process of pasteurization is expedited and rendered more uniform and thorough.

The main object of this invention is to produce a closed vat or holder through which the milk flows in a space or channel of such length that the time required for the milk to flow from one end to the other of said channel without interrupting its flow will be sufficient for pasteurizing the milk, while the vat is of compact form and large capacity and of a construction which permits the surfaces with which the milk comes in contact to be readily and thoroughly cleaned.

Other objects of the invention are to construct the vat of separate sections which normally coöperate to form closed flow spaces for the milk but are mounted and arranged so that they can be quickly and easily separated to afford access to all portions of the holder for cleaning it; and also to arrange and mount the sections so that the movable sections counterbalance each other and thereby lessen the labor of moving them.

In the accompanying drawings, consisting of three sheets: Figure 1 is a broken side elevation of a milk holder embodying the invention. Fig. 2 is a fragmentary cross section, on an enlarged scale, in line 2—2, Fig. 6, of one of the receptacles of the vat. Fig. 3 is a fragmentary longitudinal section thereof, on an enlarged scale, in line 3—3, Fig. 6. Fig. 4 is an end elevation, on an enlarged scale, of the holder showing the sections thereof separated. Fig. 5 is a fragmentary longitudinal sectional elevation thereof in line 5—5, Fig. 4. Fig. 6 is a plan view of one of the vat sections showing a corner portion of the supporting frame in section, in line 6—6, Fig. 5. Fig. 7 is a longitudinal section of the vat in line 7—7, Fig. 6.

Like reference characters refer to like parts in the several figures.

The holder or vat is composed of a plurality of separate receptacles or sections arranged one over the other and mounted in a supporting frame so that they can be positioned one on and closing the other and can be separated vertically to afford access to the several receptacles. There are preferably three of the receptacles thus arranged, the middle receptacle being stationarily secured in the supporting frame and the upper and lower receptacles being mounted so as to move vertically toward and from the middle receptacle.

The supporting frame may be of any suitable construction, that shown in the drawings consisting of upright corner posts $A$ connected by end cross bars $a$ and top side bars $a'$.

$B$, $B'$, $B^2$, represent the three receptacles or sections of the vat. Each receptacle is of shallow, substantially rectangular shape and is provided with parallel vertical partitions $b$ and $b'$ which extend longitudinally in the receptacle and are alternately joined to the opposite end walls thereof so as to form a long sinuous channel or flow space for the milk extending from one to the other of diagonally opposite corners of the receptacle.

The receptacle may be of any suitable construction, but it preferably consists, as shown in Figs. 2, 3 and 7, of opposite end castings $b^2$ joined by a metal sheet $b^3$ which is folded upon itself to form the partitions $b$, $b'$, and the concave bottoms of the milk spaces between the partitions. The ends of the portions of the sheet forming the partitions are secured to alternate inwardly-projecting portions $b^4$ and upright posts $b^5$ on the end castings. The double walled partitions formed by the folded sheet are stiffened by thin fitting boards $b^6$. The end castings are also connected by a strengthening frame consisting of upper side angle bars $c$, to which the side edges of the metal sheet $b^3$ are secured, lower side angle bars $c'$ which are connected by bottom cross bars $c^2$, and longitudinal bars $c^3$ of inverted V-form which are supported by the bottom cross bars $c^2$ between and support the concave bottoms of the milk spaces. The outwardly-projecting flanges of the upper side bars $c$ are joined at their ends to flanges on the end castings, thus forming an outwardly-projecting flange $c^4$ surrounding the upper portion of the receptacle. An insulating jacket for the receptacle is formed by vertical sheet metal walls $c^5$ secured to the outer edge of the flange $c^4$ and the lower side bars $c'$ and connected by a bottom wall $c^6$ arranged below the bottom cross bars $c^2$. The lower edge of the vertical jacket walls extend downwardly beyond the bottom jacket wall so as to inclose the upper edge of the next receptacle below and bear on the flange $c^4$ thereof, to thereby effectually cover and close the lower receptacle. The receptacle thus constructed is tinned which effectually fills all crevices and produces a suitable surface for contact with the milk.

The milk is delivered to the upper receptacle of the vat by a suitable pipe D adapted to be inserted in a hole $d$ in one corner of the receptacle, and flows through the sinuous channel of this receptacle to a discharge pipe $d'$ at the diagonally opposite corner of the receptacle through which the milk flows into the adjacent end of the milk channel of the next receptacle below. The milk flows through the sinuous channel of the second receptacle and is discharged into the lower receptacle in a similar manner, and after flowing through the channel of the lower receptacle passes out by a discharge pipe $d^2$ provided with a hand valve $d^3$.

In starting the apparatus the valve $d^3$ is closed and the milk rises in the lower receptacle until this receptacle is substantially full, when a suitable float actuated valve E, shown by dotted lines in Fig. 7, therein operates to shut off the discharge from the second receptacle and the latter then fills until a similar float valve E' operates to shut off the discharge for the upper receptacle and allows the upper receptacle to fill. When the upper receptacle becomes substantially full the milk at the discharge end of the lower receptacle will have remained in the vat the required period of time for pasteurizing it, and the valve $d^3$ of the discharge pipe is opened to allow the milk to flow from the vat. Thereafter the milk will flow continuously, or without interruption, through the vat, passing in succession through the sinuous channels of the several receptacles of the vat. The combined length of the several channels is such that with the milk flowing at a definite speed, a definite period of time, sufficient for the pasteurization of the milk will be required for each portion of the milk to pass through the vat. For example, if the aggregate length of the milk channels is three hundred and sixty feet and the milk flows at the rate of twelve feet per minute, it will require thirty minutes for a particular portion of milk to pass through the vat. By the described construction this length of the channels is obtained in a vat of large capacity which is nevertheless of comparatively small dimensions.

The vat receptacles are preferably mounted in the supporting frame in the following manner to allow of their separation for cleaning them, see particularly Figs. 1, 4 and 5: The middle receptacle is stationarily secured in the frame A, for which purpose the projecting ends of the lower side bars $c'$ thereof are bolted to the corner and end cross bars of the frame. The upper and lower receptacles are secured to the opposite ends of four chains F which are arranged in pairs at opposite ends of the vat and pass around sprocket wheels $f$ secured to two horizontal supporting shafts G journaled at the upper portion of the opposite ends of the frame in suitable bearings thereon, whereby the top and bottom receptacles are movable vertically toward and from the middle receptacle and counterbalance each other. The chains F are preferably attached to the projecting ends of the side bars $c'$ of the receptacles. These bars extend close beside the corner posts of the frame and prevent undue lateral motion of the receptacles when being moved. One of the supporting shafts G is connected to a crank shaft H for operating it by a chain $h$ passing around sprocket wheels on the supporting shaft G and the crank shaft, and the two supporting shafts are caused to turn together so as to move the opposite ends of the receptacles correspondingly and keep them always parallel by a chain I passing around sprocket wheels $i$ on the two supporting shafts.

K and K', Figs. 1 and 6, represent hand screws passing through threaded bearings on the corner posts of the frame, the former being adapted for engagement with the side bars $c'$ of the bottom receptacle to lock the receptacles from movement when together, and the latter being for engagement with the side bars $c'$ of the top receptacle to lock the receptacles when separated. The vat receptacles can be differently mounted and operated by other suitable means to place them together in the operative position and to separate them for cleaning, and any other means can be employed for holding them in the different positions.

L represents a cover of suitable form for closing the top receptacle. Chains $l$ are shown attached to the opposite ends of the cover and passing over sprocket wheels *l'* loose on the shafts G for lifting the cover. These chains are adapted to be engaged with hooks *m* on the end cross bars of the frame for holding the cover when lifted. The construction of the cover and the operating means therefor is not essential and any suitable construction could be used.

In the use of the vat the several receptacles are secured in the position shown in Figs. 1 and 7, in which they are together and close each other and the supply and discharge pipes D and $d^2$ are connected to the circulating pipes of the pasteurizing apparatus, so that the milk passes through the vat, as explained. When it is desired to clean the vat the cover is lifted and secured, and the upper and lower receptacles are respectively raised and lowered away from the middle receptacle by turning the crank shaft H, the screws K being first operated to release the receptacles. When the receptacles are thus separated, Figs. 4 and 5, the channels thereof are opened and accessible and the receptacle can be thoroughly cleaned.

It is obvious that the number of sections may be increased or reduced. For instance, the stationary middle section may be omitted, in which case the two movable sections will close against each other and the counterbalancing feature will remain undisturbed, or one of the movable sections may be omitted, in which case the advantage of counterbalancing one section by another will be lost. The arrangement of sections shown and described is, however, preferred since it produces a vat of large holding capacity in a comparatively small space and affords easy access to the flow passages for cleaning the same. The cross sectional area or flow area of the flow passage or channel is of such size that all parts of the stream of liquid move through the passage or channel with a uniform, although slow, movement, whereby dead spaces in which the liquid does not move and eddies are avoided and all parts of the liquid are subjected to the action of the heat to the same extent and for the same length of time, thus effecting a uniform and reliable pasteurization.

While this apparatus is particularly useful for the treatment of milk and milk derivatives, for instance, cream, skimmilk, &c., it may also be employed in the treatment of other liquids.

We claim as our invention:

1. A pasteurizing vat comprising a plurality of separable superposed sections, each provided with a sinuous flow channel for the liquid to be pasteurized and having in its bottom a discharge opening through which the liquid is drained from the channel, the discharge opening in the upper section delivering the liquid into the receiving end of the channel in the next lower section, substantially as set forth.

2. A pasteurizing vat comprising a plurality of superposed sections, each provided with a flow channel for the liquid to be pasteurized and having in its bottom a discharge opening through which the liquid is drained from the channel, the discharge opening in the upper section delivering the liquid into the receiving end of the next lower section, and controlling means applied to said discharge openings for permitting a regulated flow of liquid therethrough while preventing the flow of air, substantially as set forth.

3. A pasteurizing vat comprising a plurality of superposed sections, each provided with a flow channel for the liquid to be pasteurized and having in its bottom a discharge opening through which the liquid is drained from the channel, the discharge opening in the upper section delivering the liquid into the receiving end of the next lower section, and automatic valves controlling the discharge openings and operating to hold the liquid in the flow channels of the sections at a predetermined depth, substantially as set forth.

4. A pasteurizing vat comprising a supporting frame, a stationary section containing a flow channel for the liquid and secured to said frame, and an upper and a lower movable section provided with flow channels and mounted in said frame respectively above and below said stationary section and capable of movement toward and from the same, substantially as set forth.

5. The combination with a vat comprising sections which are vertically movable toward and from each other, of connecting mechanism whereby said sections are moved simultaneously in opposite directions, substantially as set forth.

6. The combination with a stationary supporting frame, of a vat comprising sections which are vertically movable in said frame toward and from each other, and connecting mechanism mounted on said frame and moving said sections simultaneously, in opposite directions, substantially as set forth.

7. A vat comprising three separable superposed sections, each provided with an open-topped flow channel, the discharge end of the channel in one section discharging into the receiving end of the channel in the next lower section, and mechanism connecting the upper and lower sections and operating to move the same simultaneously toward and from the middle section, substantially as set forth.

8. The combination with a stationary supporting frame, of a vat comprising a fixed section secured to said frame and upper and lower movable sections arranged respectively above and below said fixed section, and mechanism for moving said movable sections against said fixed section or away from the same, substantially as set forth.

9. The combination with a stationary supporting frame, of a vat comprising sections which are vertically movable in said frame toward and from each other, rotatable shafts journaled in said frame and provided with chain wheels, and chains passing over said wheels and connected at opposite ends to different sections for moving said sections toward and from each other, substantially as set forth.

10. The combination with a stationary supporting frame, of a vat comprising sections which are vertically movable in said frame toward and from each other, a movable cover applied to the uppermost section, rotatable shafts journaled in said frame and provided with chain wheels, chains passing over said wheels and connected at opposite ends to different sections for moving said sections toward and from each other, lifting chains for said cover, wheels over which said cover chains pass, and means for securing said cover chains to hold the cover in the raised position, substantially as set forth.

11. A receptacle comprising opposite end pieces which form the end walls of the receptacle and are provided with alternate upright posts and inwardly extending portions, and a metal sheet which connects said end pieces and forms the bottom and side walls of the receptacle and has folded portions attached to said upright posts and inwardly extending portions of the end pieces to form a sinuous flow channel in the receptacle, substantially as set forth.

12. A receptacle comprising opposite end pieces, a metal sheet which connects said end pieces and forms the bottom and side walls of the receptacle and is folded to form partitions in the receptacle between said side walls, insulating walls spaced from said bottom and side walls, and a strengthening frame for the receptacle connecting said end pieces and arranged between said metal sheet and said insulating walls, substantially as set forth.

13. A receptacle comprising opposite flanged end pieces, a metal sheet which connects said end pieces and forms the bottom and side walls of the receptacle and is folded to form partitions in the receptacle between said side walls, and side bars to which the side edges of said sheet are attached and which have flanges joining the flanges of the end pieces, substantially as set forth.

Witness our hands in the presence of two subscribing witnesses.

HARVEY FELDMEIER.
CHARLES B. DALZELL.

Witnesses:
GRIFFITH PRICHARD,
W. T. WOLFENDEN.